United States Patent [19]

La Fiandra et al.

[11] Patent Number: 4,516,062
[45] Date of Patent: May 7, 1985

[54] ACTUATOR

[75] Inventors: Carlo La Fiandra, New Canaan; Peter B. Mumola, Huntington, both of Conn.

[73] Assignee: The Perkin-Elmer Corporation, Norwalk, Conn.

[21] Appl. No.: 545,985

[22] Filed: Oct. 27, 1983

[51] Int. Cl.³ .............................................. G05B 19/36
[52] U.S. Cl. ..................... 318/676; 318/653; 318/686; 335/220
[58] Field of Search ............... 318/676, 653, 640, 675, 318/686, 687, 689; 335/220, 229

[56] References Cited

U.S. PATENT DOCUMENTS

| | | | |
|---|---|---|---|
| 3,359,471 | 12/1967 | Hart et al. | 318/676 X |
| 3,936,717 | 2/1976 | Hardin | 318/676 |
| 4,123,696 | 10/1978 | Olsen | 318/676 X |
| 4,200,828 | 4/1980 | Ridler et al. | 318/676 X |
| 4,274,039 | 6/1981 | Glassey et al. | 318/676 X |
| 4,310,841 | 1/1982 | Olsen | 318/676 X |

*Primary Examiner*—B. Dobeck
*Attorney, Agent, or Firm*—Thomas P. Murphy; Edwin T. Grimes; F. L. Masselle

[57] ABSTRACT

This invention is directed to an actuator which is particularly adapted among many other possible uses, or use in adjusting the configuration of deformable mirrors. The actuator comprises a housing mounted for movement on a fixed base, the housing being fabricated from magnetic material and being configured to have two spaced pole faces of opposite polarity, a housing coil mounted on the housing to form an electro-magnet, apparatus for moving the housing having infinite reflected inertia, a force arm mounted for movement on a fixed base, one portion of the force arm having an output drive pick-off and another portion of the force arm being disposed between the poles faces of the housing, pole pieces mounted on the force arm adjacent the pole faces, respectively, a force arm coil mounted on the force arm to form an electro-magnet, a first permanent magnet mounted on the housing and a second permanent magnet mounted on the force arm which coact to form a magnet coupling between the force arm and the housing, a controller for controlling the apparatus for moving the housing to thereby control the course adjustment output from the force arm and provide low frequency integration of the force arm and for controlling the flow of current to the housing coil and the force arm coil to provide a net force greater than the net force of the two permanent magnets to thereby control the fine adjustment output from the force arm.

14 Claims, 2 Drawing Figures

ACTUATOR

FIELD OF INVENTION

This invention relates to actuators and more particularly to a wide dynamic range-position integrating actuator. Actuators fabricated according to the invention are particularly adapted, among many other possible uses, for use in adjusting the configuration of deformable mirrors.

BACKGROUND OF THE INVENTION

Heretofore, actuators used for adjusting the configuration of deformable mirrors comprised a rotatably mounted rotor mounted in a magnetic field. The rotar had magnetic drive windings located at one end thereof; and the drive output pick-off was at the other end. The magnetic windings generated a clockwise or counterclockwise rotational torque about the pivot; depending upon the polarity of the drive current. A flexure was used to couple the actuator to the mirror drive post.

While the actuator devices of the prior art were reasonably successful, the present invention is directed to a new actuator drive which is an improvement over such prior devices, as will become apparent as the description preceeds.

SUMMARY OF THE INVENTION

In order to accomplish the desired results, the present invention provides in one form thereof a new and improved actuator device which includes a housing mounted for movement on fixed base means, the housing being fabricated from magnetic material and being configured to have two spaced pole faces of opposite polarity. A housing coil is mounted on the housing to form an electromagnet in combination with the housing. Means are provided having infinite reflected inertia for moving the housing. A force arm is mounted for movement on fixed base means, one portion of the force arm having an output drive pick-off and another portion of the force arm being disposed between the pole faces of the housing. Pole pieces are mounted on the force arm adjacent the pole faces, respectively. A force arm coil is mounted on the force arm to form an electromagnet with the force arm and the pole pieces. First permanent magnet means are mounted on the force arm which coact to form a magnetic coupling between the force arm and the housing. Control means are provided for controlling the means for moving the housing to thereby control the course adjustment output from the force arm and provide low frequency integration of the force arm; and for controlling the flow of current to the housing coil and said force arm coil to provide a net force greater than the net force of the two permanent magnets to thereby control the fine adjustment output from the force arm.

In one form of the invention the housing is of generally U-shaped configuration with the ends of its arms forming the pole pieces of opposite polarity.

In a form of the invention, the means for moving the housing comprises a lead screw drivable by motor means, said lead screw being drivably connected to said housing, whereby energization of the motor means causes a corresponding movement of the housing.

According to the invention, in one form thereof, the force arm is an elongated member pivotally mounted on fixed base means, one end of the arm having an output drive pick-off and the other end thereof being disposed between the pole pieces of the housing.

Still further, in accordance with the invention, in one form thereof; the first permanent magnet means is a generally U-shaped magnet and the second permanent magnet means is a generally bar-shaped magnet, said permanent magnet being so arranged that the north pole of the bar-shaped magnet is adjacent the north pole of the U-shaped permanent magnet and the south pole of the bar-shaped magnet is adjacent the south pole of the U-shaped permanent magnet to form the magnetic coupling between the force arm and the housing.

Still further according to the invention, in one form thereof; position sensor means are mounted adjacent the force arm to indicate the position thereof.

There has thus been outlined rather broadly the more important features of the invention in order that the detailed description thereof that follows may be better understood, and in order that the present contribution to the art may be better appreciated. There are, of course, additional features of the invention which will be described hereinafter and which will form the subject of the claims appended hereto. Those skilled in the art will appreciate that the conception upon which the disclosure is based may readily be utilized as a basis for the designing of other devices for carrying out the several purposes of the invention. It is important, therefor, that the claims be regarded as including such equivalent devices as do not depart from the spirit and scope of the invention.

Several embodiments of the invention have been chosen for purposes of illustration and description, and are shown in the accompanying drawings forming a part of the specification.

DETAILED DESCRIPTION OF INVENTION

Figure 1:
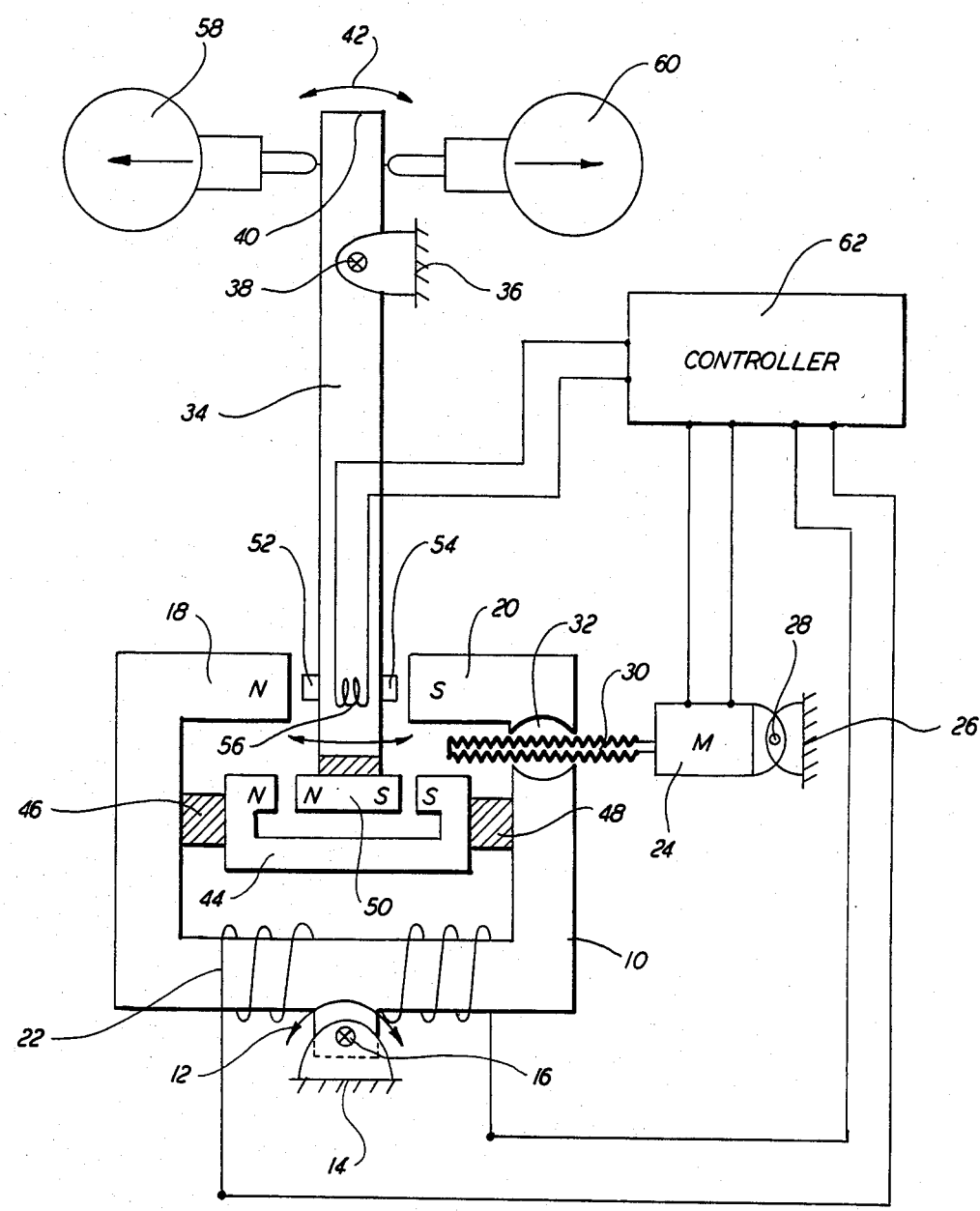
FIG. 1 is a schematic representation of an actuator constructed according to the concepts of the present invention.

In the embodiment of the invention illustrated in FIG. 1, an actuator drive comprises a housing 10 mounted for pivotal movement, as indicated by the arrow 12 in the figure, on a fixed base 14. Any suitable pivotal means may be employed such as, for example, a Bendix-type flexure connection as indicated at 16. This housing is fabricated from magnetic material and is of generally U-shaped configuration with the ends 18 and 20 of its arms forming pole faces of opposite polarity.

A housing coil 22 is mounted on the housing in the portion thereof between said arms to form an electromagnet in combination with said housing.

Motor means 24 are mounted for pivotal movement on a fixed base 26. Any suitable pivotal means may be employed such as, for example, a Bendix type flexure connection as indicated at 28.

A lead screw 30 is driven by the motor means 24. This lead screw is operatively connected to the housing 10 as at 32, whereby energization of the motor means 24 causes a corresponding movement of the housing 10. Instead of the lead screw illustrated, other suitable driving means may be employed. However, the driving means must have infinite reflected inertia. That is, it must be a one-way gear train whereby it can not be driven from the output end. It can be driven in either direction from the input end. This feature provides the low frequency position integrating feature of the acuator. Thus, when the housing 10 is moved from one position to a second position it stays at that second position. It will stay at the second position even if the application of power is terminated. This is advantageous from the standpoint of power consumption and also for thermal reasons. This makes the actuator particularly suitable for space installations where once the actuator is in its course position, it will stabilize or hold there without using any energy.

The actuator further includes an elongated force arm 34 pivotally mounted on fixed base means 36. Any suitable pivotal means may be emloyed such as, for example, a Bendix-type flexure connection as indicated at 38. One end 40 of the arm 34 has an output drive pick-off as indicated by arrow 42 in FIG. 1. The other end of the arm is disposed between the arms 18 and 20 of the housing 10.

A generally U-shaped permanent magnet 44 is fixedly mounted on the housing 10 between the arms 18 and 20, as indicated at 46 and 48.

A generally bar-shaped permanent magnet 50 is fixedly mounted on the other end of force arm 34 between the arms of the U-shaped permanent magnet 44 so that the north pole of the bar-shaped magnet is adjacent the north pole of the U-shaped permanent magnet and the south pole of the bar-shaped magnet is adjacent the south pole of the U-shaped permanent magnet to form a magnetic coupling between the force arm 34 and the housing 10. As a result, movement of the housing 10 causes a corresponding movement of the force arm 34. Moreover, high frequency vibrations of the housing 10 will tend to be dampened out before reaching the force arm.

Pole pieces 52 and 54 are mounted on the force arm 34 adjacent the pole faces 18 and 20, respectively. A force arm coil 56 is mounted on the force arm 34 to form an electromagnet with the force arm and pole pieces.

Position sensor means 58 and 60 are mounted adjacent the force arm 34 to indicate the position thereof. Any suitable type of position indicating gauges may be employed such as, for example, mechanical gauges, optical position sensors, or electronic type gauges.

Controller means 62 are provided, which control the flow of electrical current to the motor means 24 and thereby control the movement of the lead screw 30, the housing 10 and the force arm 34 to provide the course adjustment output from the force arm and to provide low frequency position integration of the force arm. In addition, the controller means 62 controls the flow of current to the housing coil 22 and the force arm coil 56 to provide a net force greater than the net force of the two permanent magnets 44 and 50 to thereby move the force arm 34 with respect to the housing 10 to thereby control the fine adjustment output from the force arm.

Figure 2:
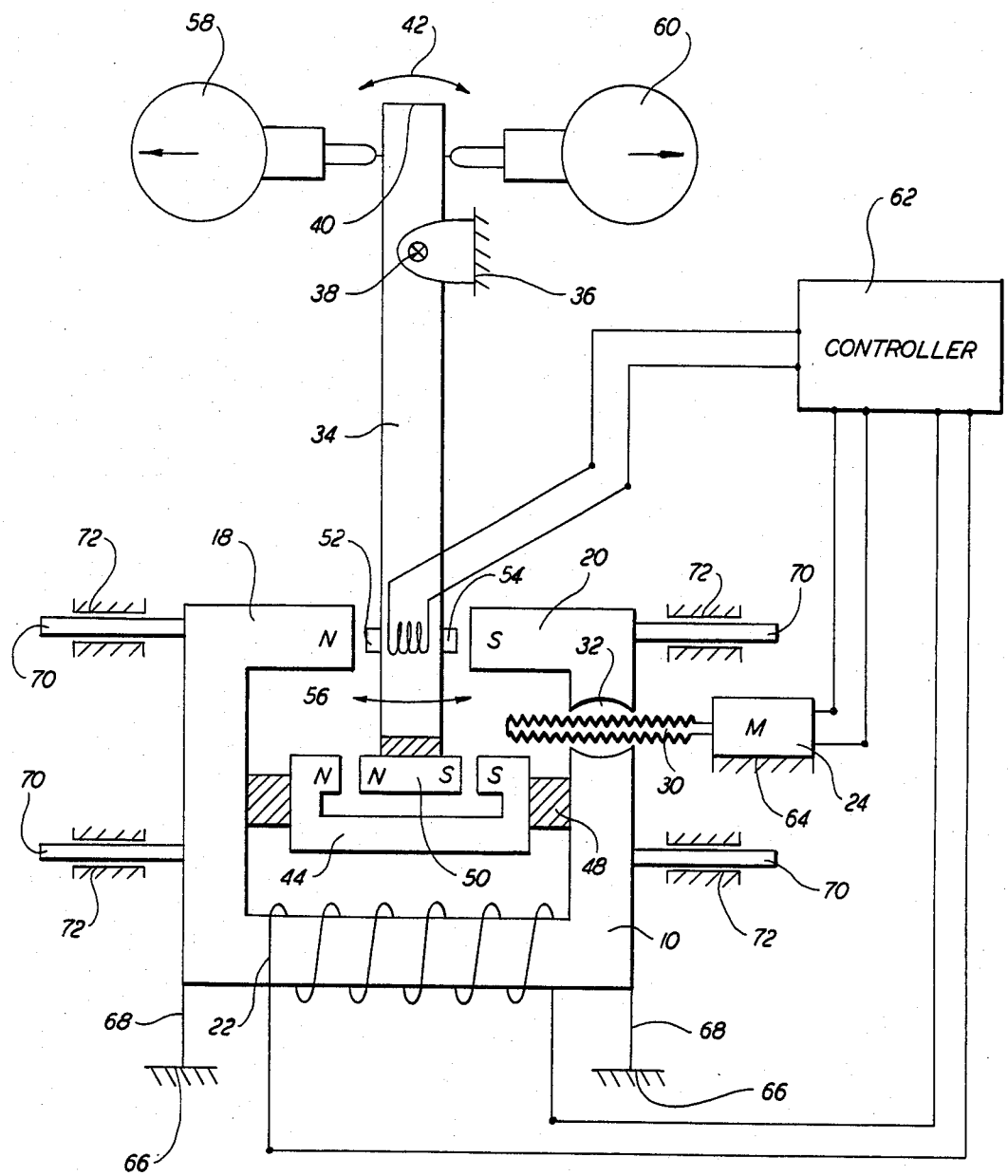
FIG. 2 is a schematic representation of another embodiment of an actuator according to the invention.

In the embodiment of FIG. 2, elements which are similar to the corresponding elements of the embodiment of FIG. 1, are identified with the same reference numerals. Essentially, the difference between the two embodiments resides in the fact that the housing 10 in the embodiment of FIG. 1 is pivotally mounted on a fixed base 14 by flexure means 16 and the motor means 24 is pivotally mounted on a fixed base 26 by flexure means 28, whereas in FIG. 2 the motor means 24 is fixedly mounted on a fixed base 64 and the housing 10 is mounted on guides for translation motion. Thus, in the embodiment of FIG. 2 the housing 10 is mounted on a fixed base 66 by flexure means 68. The housing 10 is provided with a plurality of laterally extending slides 70 which are adapted to slide in horizontal guides 72, thereby confining and controlling the motion of the housing 10. It is noted that the force arm 34 pivotally moves in the same manner in both embodiments.

It will thus be seen that the present invention does indeed provide a new and improved actuator which has both course and fine adjustment, which is compact, which dampens out high frequency vibrations, and which has a low frequency position integrating feature. In addition, this actuator can be used in conjunction with a plurality of like actuators for controlling the configuration of deformable mirror systems, by performing a built-in redundancy. That is, if one actuator losses power, it will remain locked in its course adjustment position and the other actuators in the system will compensate for it; thereby very closely conforming the mirror to the configuration that would have been achieved without the malfunction of said one actuator.

Although specific embodiments have been illustrated and described, it will be obvious to those skilled in the art that various modifications may be made without departing from the spirit and scope of the invention, which is to be limited solely by the appended claims.

What is claimed is:

1. An actuator comprising, in combination:
 a housing mounted for movement on fixed base means, said housing being fabricated from magnetic material and being configured to have two spaced pole faces of opposite polarity;
 a housing coil mounted on said housing to form an electromagnet in combination with said housing;
 means having infinite reflected inertia for moving said housing;
 a force arm mounted for movement on fixed base means, one portion of said force arm having an output drive pick-off and another portion of said force arm being disposed between the pole faces of said housing;
 pole pieces mounted on said force arm adjacent said pole faces, respectively;
 a force arm coil mounted on said force arm to form an electromagnet with said force arm and said pole pieces;
 first permanent magnet means mounted on said housing and second permanent magnet means mounted on said force arm which coact to form a magnetic coupling between said force arm and said housing;
 controller means for controlling said means for moving said housing to thereby control the course adjustment output from said force arm and provide low frequency integration of the force arm; and for controlling the flow of current to said housing coil and said force arm coil to provide a net force greater than the net force of the two permanent magnets thereby controlling the fine adjustment output from said force arm.

2. An actuator according to claim 1 wherein said housing is of generally U-shaped configuration with the ends of its arms forming the pole faces of opposite polarity.

3. An actuator according to claim 1 wherein said housing is mounted for movement on fixed base means by a Bendix-type flexure connection.

4. An actuator according to claim 1 wherein said housing is mounted for movement on fixed base means by guide means which limit the travel of the housing to substantially linear movement.

5. An actuator according to claim 2 wherein said housing coil is mounted on said housing in the portion thereof between said arms to form the electromagnet.

6. An actuator according to claim 1 wherein said means for moving said housing comprises a lead screw drivable by motor means, said lead screw being operatively connected to said housing, whereby energization of said motor means causes a corresponding movement of said housing.

7. An actuator according to claim 1 wherein said force arm is an elongated member pivotally mounted on fixed base means, one end of said arm having an output drive pick-off and the other end thereof being disposed between the pole pieces of said housing.

8. An actuator according to claim 1 wherein said first permanent magnet means is a generally U-shaped magnet and said second permanent magnet means is a generally bar-shaped magnet, said permanent magnets being so arranged that the north pole of the bar-shaped magnet is adjacent the north pole of the U-shaped permanent magnet and the south pole of the bar-shaped magnet is adjacent the south pole of the U-shaped permanent magnet to form the magnetic coupling between the force arm and the housing.

9. An actuator according to claim 1 further including position sensor means mounted adjacent said force arm to indicate the position of said force arm.

10. An actuator comprising, in combination:
a housing mounted for movement on fixed base means, said housing being fabricated from magnetic material and being of generally U-shaped configuration with the ends of its arms forming pole faces of opposite polarity;
a housing coil mounted on said housing in the portion thereof between said arms to form a electromagnet in combination with said housing;
motor means mounted for movement on fixed base means;
a lead screw drivable by said motor means, said lead screw being operatively connected to said housing and having infinite reflected inertia, whereby energization of said motor means causes a corresponding movement of said housing;
an elongated force arm pivotally mounted on fixed base means, one end of said arm having an output drive pick-off and the other end thereof being disposed between the arms of said housing;
a generally U-shaped permanent magnet fixedly mounted on said housing between said arms;
a generally bar-shaped permanent magnet fixedly mounted on said other end of said force arm and between the arms of said U-shaped permanent magnet so that the north pole of the bar-shaped magnet is adjacent the north pole of the U-shaped magnet and the south pole of the bar-shaped permanent magnet is adjacent the south pole of the U-shaped magnet to form a magnetic coupling between said force arm and said housing;
pole pieces mounted on said force arm adjacent said pole faces, respectively;
a force arm coil mounted on said force arm to form an electromagnet with said force arm and said pole pieces;
position sensor means mounted adjacent said force arm to indicate the position of said force arm;
controller means for controlling the flow of current to said motor means to thereby control the course adjustment output from said force arm and provide low frequency position integration of the force arm, and for controlling the flow of current to said housing coil and said force arm coil to provide a net force greater than the net force of the two permanent magnets to thereby control the fine adjustment output of said force arm.

11. An actuator according to claim 10 wherein said housing is mounted for movement on fixed base means by a Bendix-type flexure connection.

12. An actuator according to claim 10 wherein said force arm is mounted on fixed base means by a Bendix-type flexure connection.

13. An actuator according to claim 10 wherein said housing is mounted for movement on fixed based means by guide means which limit the travel of the housing to substantially linear movement.

14. An actuator according to claim 10 wherein said position sensor means are mechanical gauges.

* * * * *